United States Patent [19]

Perego

[11] Patent Number: 5,722,565
[45] Date of Patent: Mar. 3, 1998

[54] CASSETTE FEEDING SYSTEM AND METHOD

[75] Inventor: Luciano Perego, Milan, Italy

[73] Assignee: Tapematic U.S.A., Inc., Orlando, Fla.

[21] Appl. No.: 745,068

[22] Filed: Nov. 7, 1996

Related U.S. Application Data

[62] Division of Ser. No. 390,055, Feb. 17, 1995, Pat. No. 5,598,949.

[51] Int. Cl.$^6$ ............................................. B65H 1/00
[52] U.S. Cl. ........................................... 221/197; 242/533
[58] Field of Search ................................. 221/290, 103, 221/92, 208, 197; 242/533, 526, 532.1, 532.7

[56] References Cited

U.S. PATENT DOCUMENTS 5,118,045  6/1992  Perego ................................. 242/533

*Primary Examiner*—Kenneth Noland
*Attorney, Agent, or Firm*—Edgar H. Haug; Curtis, Morris & Safford, P.C.

[57] ABSTRACT

In a machine for loading tape into cassettes, the cassettes to be processed are oriented horizontally and disposed one upon the other to form a stack vertically engaged in a magazine. A collapsible support located at the base of the magazine engages the lowermost cassette in the stack in order to orient it vertically and let it fall into fitting guide pieces associated with a loading station located in the loading machine. A retention element operable by an actuator maintains the positioning of the cassette on the collapsible support while the latter is moving to the dropped position.

10 Claims, 3 Drawing Sheets

CASSETTE FEEDING SYSTEM AND METHOD

This application is a Division of Ser. No. 08/390,055 filed Feb. 17, 1995 now U.S. Pat. No. 5,598,949.

FIELD OF THE INVENTION

The present invention relates generally to systems and methods for loading tape into cassettes and more particularly to systems and methods for feeding cassettes into position for loading with tape.

BACKGROUND OF THE INVENTION

Automatic machines for loading tape into cassettes in which the cassettes to be loaded with magnetic tape are disposed in a magazine located above a loading station are known. Such loading or storage magazines are adapted to receive a given amount of cassettes to be processed which are horizontally oriented and disposed consecutively upon each other to form an upright stack. At the lowermost end of the stack, the cassettes are picked up one-by-one by transferring means which engages them sequentially in the loading station to carry out the tape loading operations.

One example of such a cassette loading machine is given in the European Patent No. 0 281 884 by the same inventor.

In such a feeding apparatus, the cassette stack located in the magazine is supported by a plate-like element movable from a rest position in which it is oriented in a horizontal plane to offer a seat for the cassette stack, to a second position in which it is inclined at an angle of about 30° in order to cause the bottommost cassette in the stack to slide from the plate-like element to a pair of guide plates extending vertically between the magazine and the loading station of the cassette loading machine, by which guide plates said cassette is engaged at the opposite sides thereof.

In greater detail, the guide plates engage the cassette through corresponding slide grooves extending parallelly to each other according to a curvilinear extension. The cassette, while following the slide grooves under gravity, is gradually rotated from the inclined orientation exhibited when entering the guide plates, to a vertical orientation at the lower end of the slide grooves. The lower and slide grooves are arranged in alignment with corresponding fitting guides in the loading station which are designed to receive cassettes and operatively engage them, one at a time, in the loading station.

The cassette's descent along the slide guides is assisted by a support element operatively disposed between the guide plates and vertically movable between the plates to cause the gradual descent of the cassette until it reaches the fitting guides disposed associated with the loading station.

While the above-described system and method has been quite effective, it is problematic when the magazine is required to be disposed very close to the loading station of the cassette loading machine. In fact, the normal path travelled by the cassette so that it may be vertically oriented requires significant space between the magazine and the loading station.

In addition, the time necessary to eject the cassette from the loading magazine, bring it into engagement between the guide plates and move it along the entire length of the slide grooves undesirably impairs the production rate in cassette loading machines.

SUMMARY OF THE INVENTION

Accordingly, one object of the present invention is to solve the drawbacks of the known art by providing a feeding apparatus capable of operating in substantially reduced space between the magazine and the loading station of the cassette loading machine. It is another object of the present invention to reduce the time necessary to transfer the individual cassettes from the magazine to the loading station.

The foregoing and further objects that will become more apparent in the course of the present description are substantially achieved by a cassette feeding apparatus in an automatic machine for loading tape into cassettes, wherein the transferring means comprises a collapsible support oscillatably engaged under the loading magazine, drive means for moving the collapsible support between a rest position in which it is substantially oriented in a horizontal plane for supporting at least one cassette disposed at the bottom in said stack, and an overturned or dropped position in which it is oriented in a substantially vertical plane for orienting the cassette vertically, at least one retention element operatively engaged with the collapsible support and movable between a thrust position in which it acts on the cassette to retain it on the collapsible support, and a release position in which it is disengaged from the cassette, first actuating means acting on the first retention element for selectively moving it to the thrust position when the collapsible support is in its rest position, and to the release position when the collapsible support is in the dropped position, to let the cassette fall vertically into the loading station.

The present invention further comprises a new method of feeding tape cassettes to a loading station. The method includes the steps of arranging a plurality of cassettes in a horizontal orientation one upon the other to form a stack extending vertically at a position above a loading station of a cassette loading machine, disposing at least one cassette situated at a lowermost position in the stack onto a collapsible support in a rest position in which the support horizontally supports the cassette, maintaining the positioning of the cassette on the collapsible support, moving the collapsible support to a dropped position in which the cassette retained thereon is oriented in a substantially vertical plane, releasing the cassette from the collapsible support to let it fall vertically into the loading station.

IN THE DRAWINGS

DESCRIPTION OF A PREFERRED EMBODIMENT

Figure 1:
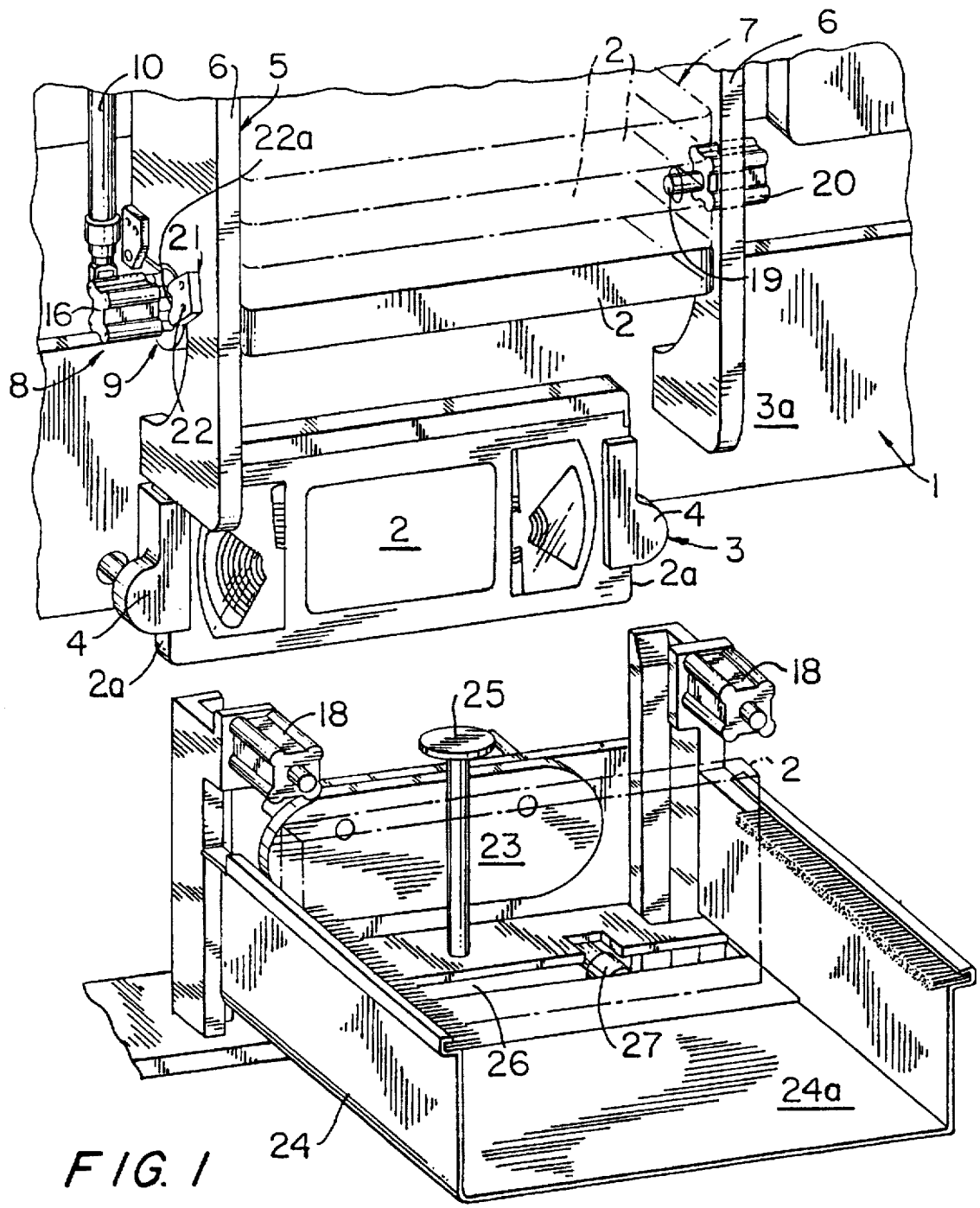
FIG. 1 is a perspective view showing the apparatus of the present invention in a waiting state, which is maintained while the cassette loading machine with which the apparatus is associated is about to wind tape into a cassette.

Referring to the drawings, a cassette feeding apparatus in an automatic machine for loading tape into cassettes according to the present invention has been generally identified by reference numeral 1.

Figure 2:
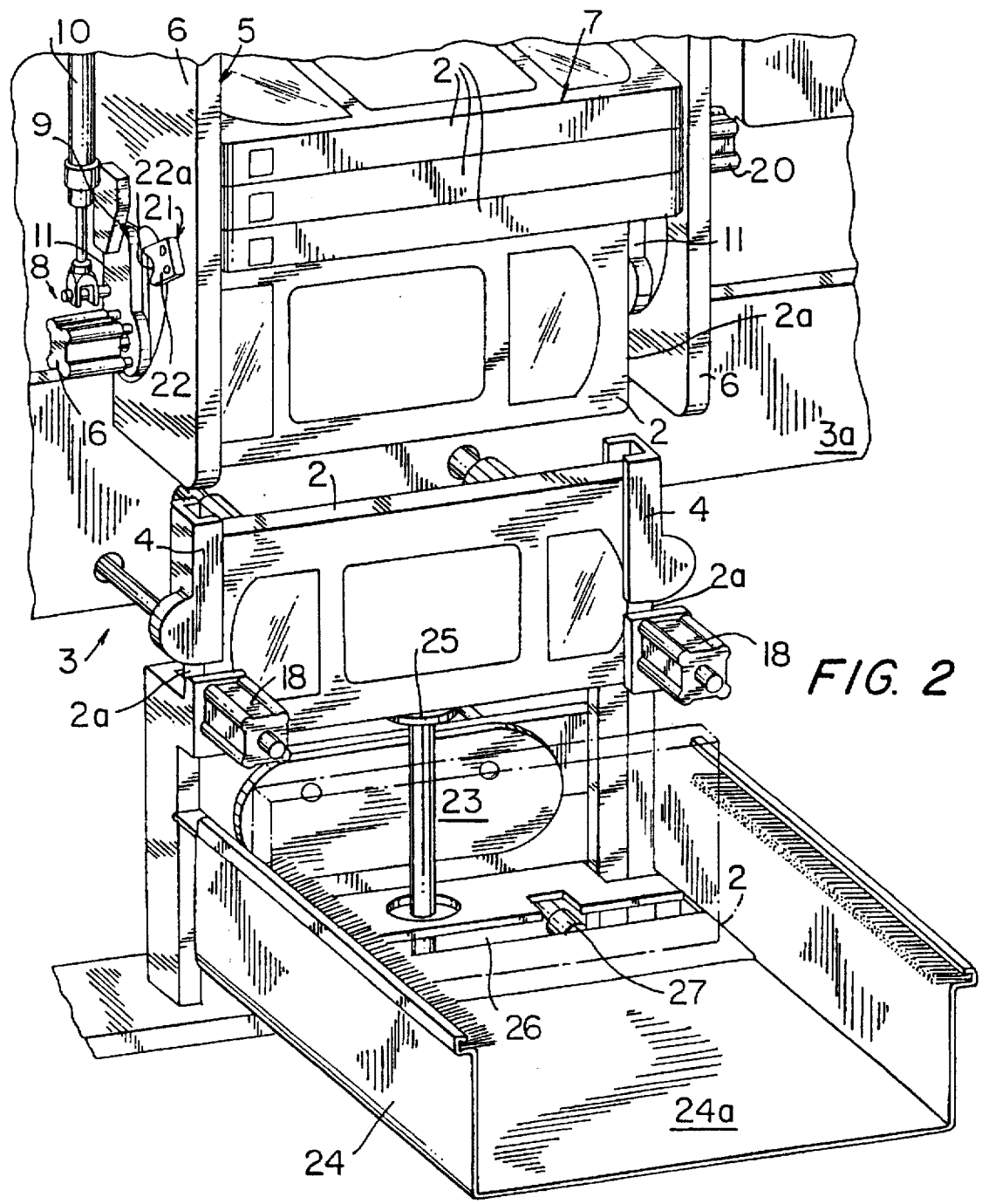
FIG. 2 is a perspective view of the apparatus of the present invention in which a cassette to be processed is engaged on a collapsible support that has disposed the cassette in a vertical orientation.
Figures 3, 4:
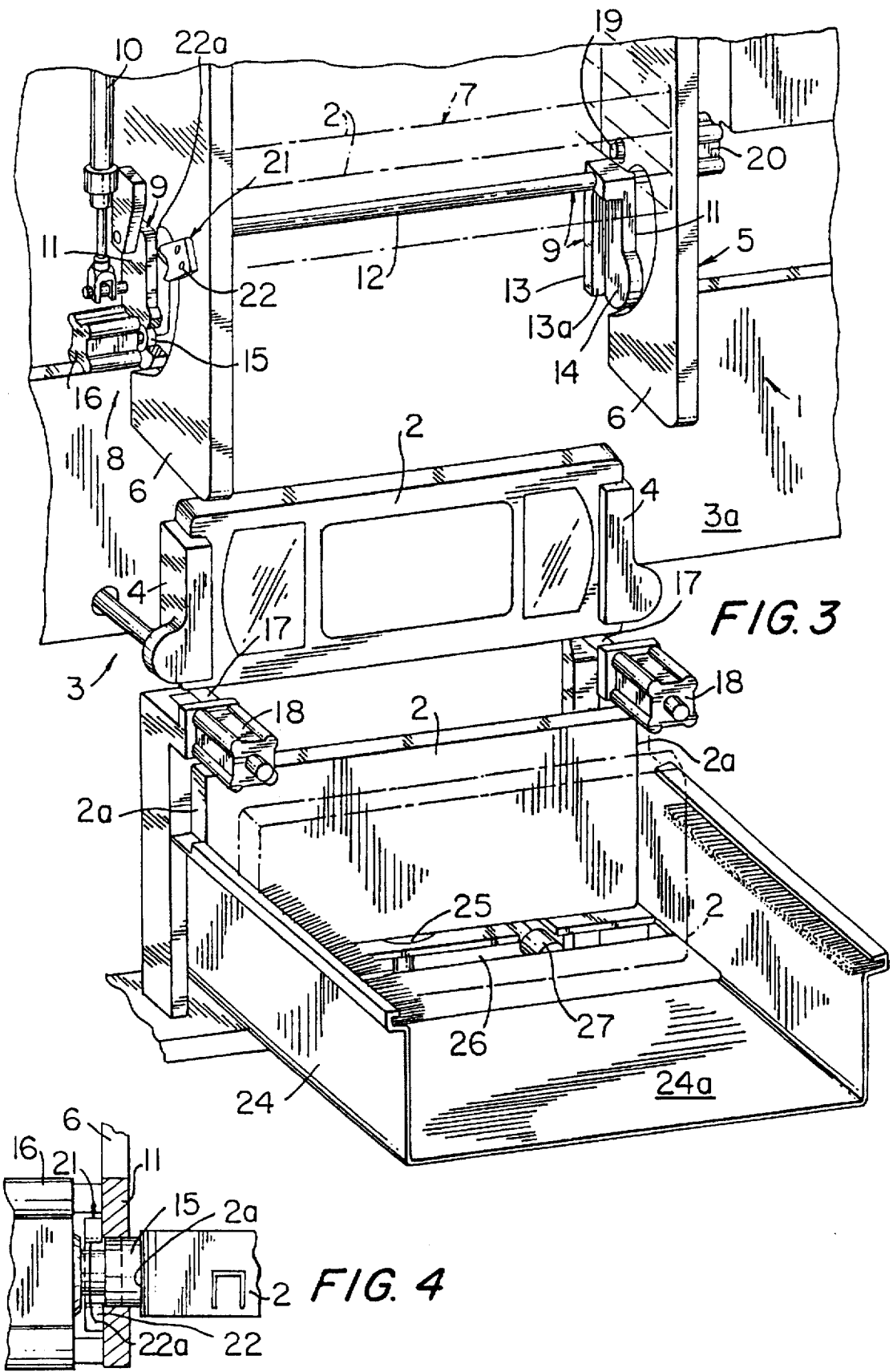
FIG. 3 shows the next operating step of the present invention after the one shown in FIG. 2, in which the cassette to be processed has been released from the collapsible support and is engaged in fitting guide pieces associated with the loading station of the cassette loading machine.
FIG. 4 shows construction detail of the present invention.

The apparatus is mounted to a cassette loading machine (not shown as a whole) designed to operate sequentially on a plurality of cassettes 2 to be processed to wind a predetermined amount of magnetic tape into each of the cassettes. The magnetic tape winding operations take place at a loading station 3 (not shown in detail) exposed on a front wall 3a of the cassette loading machine. Associated with the loading station 3 is a pair of fitting guide pieces 4 which operatively engage the individual cassettes 2 at the opposite sides 2a thereof and are selectively movable between a retracted position in which they are close to the front wall 3a for bringing the cassette 2 into engagement with the different members (not shown) of the loading station 3 for executing the tape winding operations, and an extended position in which, as shown in FIGS. 2 and 3, they are spaced apart from the front wall for causing the release of a loaded cassette and the engagement of a new cassette 2 to be processed by the apparatus 1.

The cassettes 2 to be processed are stored in a magazine 5 disposed above the loading station 3. In the embodiment shown, the magazine 5 essentially comprises two holding plates 6 disposed vertically and jutting out from the front wall 3a. The cassettes 2 engaged between the holding plates 6 are oriented horizontally and disposed consecutively upon each other to form a stack 7 vertically standing between the plates 6.

The apparatus 1 further comprises transferring means 8 that, at each operating cycle, picks up the bottom most cassette 2 from the stack 7 and transfers it to the loading station 3 where it is disposed in a substantially vertical orientation. In greater detail, the supply of cassettes 2 to the loading station according to a method in which, the following steps are carried out:

disposing at least one cassette 2 situated at a lowermost position in the stack 7 onto a collapsible support 9 arranged in a rest position in which it horizontally supports the cassette 2;

maintaining the positioning of the cassette 2 on the collapsible support 9;

moving the collapsible support 9 to a dropped position in which the cassette 2 retained thereon is oriented in a substantially vertical plane; and releasing the cassette from the collapsible support 9 to let it fall vertically into the loading station 3.

To this end, drive means 10 is associated with the collapsible support 9 and is rotatably engaged between the holding plates 6 of the magazine 5 along a horizontal axis extending adjacent to the front wall 3a of the cassette loading machine. The drive means 10 selectively moves the collapsible support between a rest position in which it is substantially oriented in a horizontal plane for supporting at least one cassette 2 disposed at the bottom in the stack 7 and a dropped position in which it is oriented in a substantially vertical plane for orienting the cassette 2 vertically. In the example shown, the drive means 10 essentially comprises a double acting primary cylinder operatively engaged between one of the holding plates 6 and the collapsible support 9 and operable upon command of a microprocessor (not shown) which governs the operation of the entire cassette loading machine.

Preferably, the collapsible support 9 comprises pair of arms 11 extending in cantilevered fashion from a horizontal pivot stem 12 rotatably engaged between the holding plates 6. Each of the arms 11 has a base portion 13 offering a resting seat 13a for the cassette 2 when the collapsible support 9 is in its rest position, and a side portion 14 which acts on one of the cassette sides 2a for guiding the fall of the cassette when the collapsible support is in the dropped position.

Operatively engaged with the collapsible support 9 is at least one retention element 15 movable, by first actuating means consisting of a first fluid-operated actuator 16, between a thrust position in which it acts against one side 2a of the cassette 2 to retain it on the collapsible support, and a release position in which it is disengaged from the cassette 2 in order to allow the cassette to fall into loading station 3 under the influence of gravity.

In the dropped position the collapsible support 9, and more particularly the arms 11 associated therewith, extend substantially in line with the fitting guide pieces 4, so that the vertically oriented cassette 2 released from the collapsible support 9 is securely and exactly fitted into the guide pieces when they are in their extended position.

Also provided is at least one stop element 17 movable between an operating position in which it is disposed along the "falling" path of the cassette 2 from the support 9 to stop the cassette when it has reached a predetermined position in the loading station 3 and a non-operating position in which it is out of the cassette path to enable the cassette to fall from the loading station 3 after it has been loaded with magnetic tape. More particularly, in the embodiment shown, two stop elements 17 are provided which essentially consist of the rods of corresponding fluid-operated actuators 18 operable upon command of the microprocessor.

When the collapsible support 9 is in the dropped position, each of the stop elements 17 is at a distance from the lower end 11a of the arms 11 of the collapsible support 9, the amount of which substantially corresponds to, or is slightly greater than the cassette size in the vertical direction. In this manner, the location of the loading magazine 5 as near as possible to the loading station 3 is ensured.

Also operatively associated with the magazine 5, more particularly, the holding plate 6, is at least one second retention element 19 that, upon command of a third fluid-operated actuator 20, can be selectively moved between a work position in which it acts on a cassette 2 disposed immediately on top of the cassette engaged on the collapsible support 9 to maintain the positioning of the stack 7 in the magazine 5, and a rest position in which it is disengaged from the cassette to let the cassettes of the stack 7 fall onto the collapsible support 9.

In order to prevent the support 9 from being dropped by the stack weight, due for example to an accidental cutout in the pneumatic and/or electric power supply to the cassette loading machine, which would cause the cassettes 2 to fall the present invention preferably includes safety means 21 to rigidly fasten the collapsible support 9 to the magazine 5 when the support is in the rest position. In more detail, the safety means 21 consists of at least one coupling portion 22 formed in the magazine 5. In one preferred embodiment, the coupling portion 22 is a shaped plate fastened to one of the holding plates 6 with a recess 22a adapted to operatively receive the first retention element 15 when the latter is returned to the release position after the collapsible support 9 has been brought to the corresponding rest position. In other words, the engagement of the first retention element 15 in the recess 22a causes the coupling portion 22 to resist the force due to the stack weight that otherwise could cause the collapsible support 9 to fall to the dropped position.

A pusher element 23 is horizontally movable below the loading station 3 to make the cassettes 2 move sequentially forward along a collection element 24 as the cassettes are released from the loading station 3. In order to prevent the individual cassettes 2 from falling directly on the collection element 24, a support disc 25 is also provided. This disc 25 is vertically movable, upon command of an auxiliary actuator (not shown) between a raised position in which it receives and supports the cassette 2 coming out of the fitting guide pieces 4 and a lowered position in which it is disposed substantially flush with a base surface 24a of the collection element 24 in order to deposit the cassette 2 thereon.

Also formed in the collection element 24, immediately downstream of the disc 25, is a transverse slot 26 through which faulty cassettes 2 are discharged from the collection element 24. To this end, associated with the slot 26 are one or more closing elements 27 consisting of blocks connected to corresponding fluid-operated actuators, selectively movable between a closing position in which they close off the cassette exit through the slot 26 in order to enable transferring of the cassettes along the collection element 24, and an opening condition in which they completely clear the slot in order to enable faulty cassettes to be discharged therethrough.

As shown in FIG. 1, when tape is being wound into a cassette 2 engaged in the loading station 3, the collapsible support 9 is held in the rest position upon the action of the primary cylinder 10, so that the bottommost cassette 2 in the stack 7 arranged in the magazine 5 is suitably engaged by the arms 11 of the collapsible support.

In this situation, the first retention element 15 is in the release position and, due to its engagement in the recess 22a of the coupling portion 22, the cassettes 2 cannot fall out of the magazine 5, should the pneumatic and/or electric power supply to the tape loading machine be accidentally cut off.

At the end of the tape winding operation, the fitting guide pieces 4 are moved away from the front wall 3a in order to cause the disengagement of the cassette from the loading station 3. The cassette 2, loaded with magnetic tape, is brought to rest on the disc 25 previously disposed in the raised position to be then lowered onto the base surface 24a of the collection element 24.

Simultaneously with the disengagement of the loaded cassette 2 from the loading station 3, the first retention element 15 is brought to the thrust position and the collapsible support 9 is moved to the dropped position in order to vertically orient the cassette 2 engaged thereon. The second retention element 19 previously brought to the work position upon command of the corresponding actuator 20, retains the cassette stack 7 preventing the cassettes from falling out of the magazine 5.

When the collapsible support 9 reaches the dropped position, the first retention element 15 is brought to the release position to cause the cassette 2 carried by the support 9 to fall vertically into the fitting guide pieces 4, stopping against the stop elements 17 previously disposed in the operating position. In this situation, the cassette 2 is completely disengaged from the collapsible support 9, which can be returned to the rest position when the first retention element 15 is returned to the thrust position. This prevents the retention element 15 from interfering with the coupling portion 22 when the collapsible support is raised. Once the collapsible element 9 has reached the rest position, the first retention element 15 is brought again to the release position and is fitted into the recess 22a while the second retention element 19 is brought to the rest position to cause the lowering of the stack 7 between the holding plates 6. This results in the engagement of a new cassette 2 on the collapsible support 9.

Meanwhile, the fitting guide pieces 4 are moved close to the front wall 3a to operatively engage the cassette 2 in the loading station 3, to start a new magnetic tape winding cycle.

The present invention thus, enables the positioning of the magazine 5 very close to the loading station 3, which results in an important reduction in bulkiness as compared to the prior known devices as well as a drastic reduction in the time necessary to transfer the individual cassettes from the magazine to the loading station.

In addition, the present invention is of much simpler construction as compared to prior feeding devices since the guide plates and movement means connected thereto for causing the gradual orientation of the cassette from an inclined position to a vertical position (as required for insertion in the loading station) are eliminated.

Obviously many modifications and variations may be made to the invention as conceived, without departing from the spirit or intent of the invention.

What is claimed is:

1. A method of feeding tape cassettes in an automatic machine for loading tape into said cassettes, comprising the steps of:

arranging a plurality of cassettes in a horizontal orientation one upon the other to form a stack extending vertically above a loading station of the cassette loading machine;

disposing at least one cassette located at a lowermost position in said stack onto a collapsible support arranged in a rest position in which it horizontally supports the cassette;

maintaining the positioning of said cassette on the collapsible support;

moving the collapsible support to be dropped position in which the cassette retained thereon is oriented in a substantially vertical plane;

releasing the cassette from the collapsible support to let it fall vertically into said loading station.

2. The method as claimed in claim 1, wherein simultaneously with the dropping step, the step of maintaining the positioning of the cassettes in said stack on top of the cassette retained on the collapsible support is also carried out.

3. The method as claimed in claim 1, further comprising the step of intercepting the fall of the cassette in the loading station for stopping said cassette in a predetermined position.

4. A cassette handling device comprising:

a magazine;

first cassette hold back means for arresting the movement of a cassette in said magazine;

cassette support means for supporting a cassette in said magazine and for transferring that cassette to cassette transfer means, wherein said cassette transfer means transfers cassettes to and from a loading station;

cassette withdrawal means for taking cassettes from said cassette transfer means and transporting the cassettes to a remote location; and second cassette hold back means for holding cassettes on said cassette support means.

5. A cassette handling device according to claim 4, further comprising rotation means for rotating said cassette support means to change the orientation of a cassette from horizontal to vertical.

6. A cassette handling device according to claim 5, further comprising locking means to lock said cassette support means in a horizontal position such that said horizontal position can be maintained to support a plurality of cassettes in said magazine without applying energy.

7. A method of transporting cassettes to and from a loading station comprising:

(a) filling a magazine with a plurality of cassettes to be loaded;

(b) supporting the bottommost cassette in said magazine with a support device in a first support position;

(c) arresting the movement of the next cassette in said magazine such that the next cassette supports all other cassettes in said magazine;

(d) arresting the movement of the bottommost cassette relative to said support device;

(e) moving said support device to a second release position to bring the bottommost cassette into position to engage cassette transfer means;

(f) releasing the bottommost cassette from said support device such that it engages said cassette transfer means;

(g) transferring the bottommost cassette to a loading station using said cassette transfer means;

(h) returning said support device to said first support position;

(i) releasing the next cassette such that the next cassette becomes the bottommost cassette in the magazine and is supported by said support device;

(j) arresting the movement of the cassette above the new bottommost cassette such that the arrested cassette supports any additional cassettes in said magazine;

(k) moving said support device to a third staging position between said first and second positions such that the new bottommost cassette is brought closer to said loading station;

(l) loading the cassette in said loading station with tape;

(m) transferring the loaded cassette out of said loading station;

(n) moving the cassette to a location remote from said loading station;

(o) moving said support device to said second release position to bring the new bottommost cassette into position to engage said cassette transfer means; and (p) repeating steps f–o to load a plurality of cassettes.

8. A method according to claim 7, further comprising the step of locking said support device in said first support position.

9. A method according to claim 8, wherein arresting the movement of a cassette supported on said support device unlocks said support device from said first support position.

10. A method according to claim 7, further comprising the step of activating stopper means to prevent cassettes from disengaging from said cassette transfer means.

* * * * *

UNITED STATES PATENT AND TRADEMARK OFFICE
CERTIFICATE OF CORRECTION

PATENT NO. : 5,722,565
DATED : March 3, 1998
INVENTOR(S) : Luciano Perego

It is certified that error appears in the above-identified patent and that said Letters Patent is hereby corrected as shown below:

On the title page of the patent, please insert in item (30) Foreign Application Priority Data --February 18, 1994 (EPO) European Patent Appl. No. 94830075.1--.

Signed and Sealed this

Twenty-first Day of July, 1998

Attest:

BRUCE LEHMAN

*Attesting Officer*     *Commissioner of Patents and Trademarks*